May 11, 1954 T. J. DUNSHEATH 2,678,421
MAGNETIC INSPECTION APPARATUS AND METHOD
Filed Jan. 18, 1951 4 Sheets-Sheet 1

Fig. 1

Inventor
Thomas J. Dunsheath
By
Attys

Patented May 11, 1954

2,678,421

UNITED STATES PATENT OFFICE 2,678,421

MAGNETIC INSPECTION APPARATUS AND METHOD

Thomas J. Dunsheath, Chicago, Ill., assignor to Magnaflux Corporation, Chicago, Ill., a corporation of Illinois Application January 18, 1951, Serial No. 206,550

25 Claims. (Cl. 324—38)

This invention relates to a magnetic inspection apparatus for magnetically inspecting pipes or other tubular members, and particularly for inspecting longitudinal welded joints on pipes and the like.

Large quantities of ferrous pipe are now produced by economical manufacturing processes essentially comprising the forming of a piece of sheet material into a generally circular cross-sectional configuration and then securing the abutting edges of the material by a longitudinal weld. In such methods of fabrication of pipes, it is obvious that the bursting strength and leak-proof properties of the pipe are primarily determined by the quality of the longitudinal weld. The application of magnetic particle inspection methods to such longitudinal welds offers a convenient, inexpensive process for determining whether the weld is defective and the location of the defect.

In the present invention, a pipe or tubular member is passed transversely through a magnetic field, magnetizable particles being progressively dusted onto the surface of the weld just prior to its entry into the magnetic field and being blown therefrom while in the magnetic field, the only particles remaining on the section of pipe leaving the magnetic field being those which cluster around a crack or other defect.

One of the principal features and objects of the present invention is to provide a novel apparatus and method for carrying out the above described operation.

An important characteristic of any apparatus for carrying out this operation is that no particles shall be dusted until the pipe is about to be passed through the magnetic field, but the pipe must have particles dusted over its entire length.

A further feature and object of the present invention is to provide novel apparatus having such features of control and operation.

An object of the present invention is to provide a magnetic inspection apparatus having a tripping mechanism responsive to the position of the pipe under test for automatically controlling the energization and deenergization of the magnetizing coils, as well as the particle applicator.

Another object of the present invention is to provide a magnetic inspection apparatus having adjusting mechanism for adjusting the center line of the poles of the magnetizing coils to provide improved distribution of the magnetizing flux lines thereby providing a more efficient unit.

Another object of the present invention is to provide an adjusting mechanism that controls the operation of a movable carriage in the upstanding frame whereby the collector unit, the hopper unit, and blower unit are placed in overlying relationship to the pipe under test thereby providing a more efficient unit.

A further object of the present invention is to facilitate the testing operation by providing a magnetic particle recovery scoop that is adjusted to ride on the pipe under test when the scoop solenoid is energized.

Another object of the present invention is to provide an apparatus and method for producing a constant flux density at the leading and trailing edges of a pipe under test.

Another object of the present invention is to provide a more efficient magnetic inspection apparatus and still maintain the ease of manipulation and operation.

The novel features which I believe to be characteristic of my invention are set forth with particularity in the appended claims. My invention itself, however, both as to its organization, manner of construction, and method of operation, together with further objects and advantages thereof, may best be understood by reference to the following description taken in connection with the accompanying drawings, in which:

While this invention has been illustrated as applied to effecting magnetic particle inspection of a longitudinal pipe joint weld, it is to be understood that it represents merely a specific application of this invention and that the principles thereof may be readily applied to effecting magnetic particle inspection of many different types of longitudinal test pieces, and particularly tubular test pieces.

Figure 1:
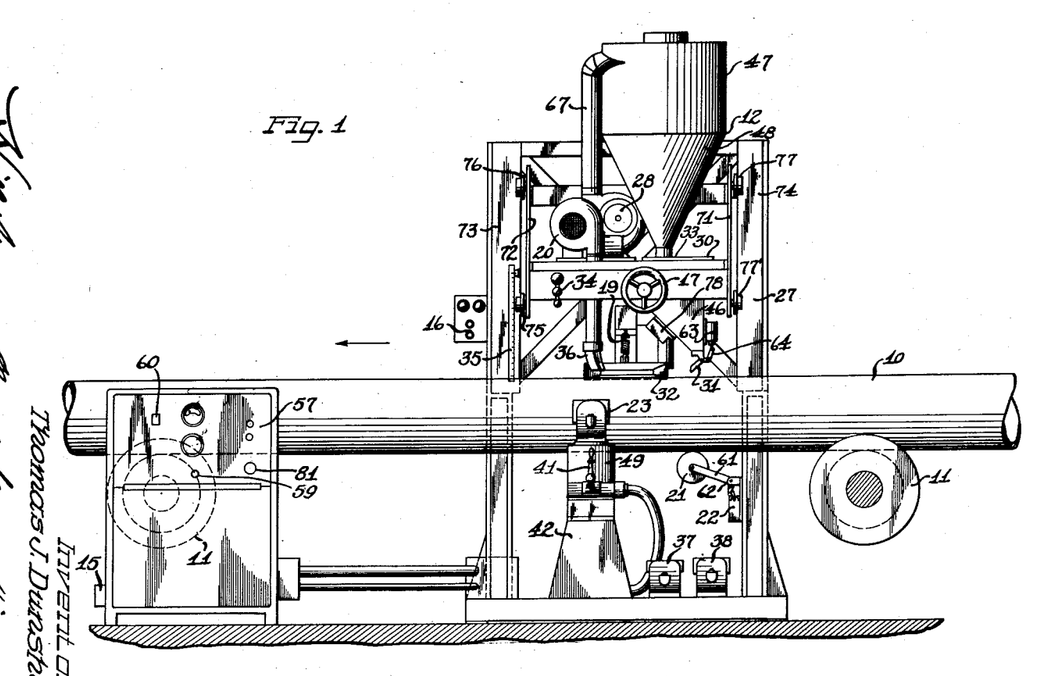
Figure 1 is a front elevational view of a magnetic inspection apparatus embodying this invention illustrating the application of such apparatus to effect magnetic inspection of a longitudinal welded joint of a pipe.
Figure 2:
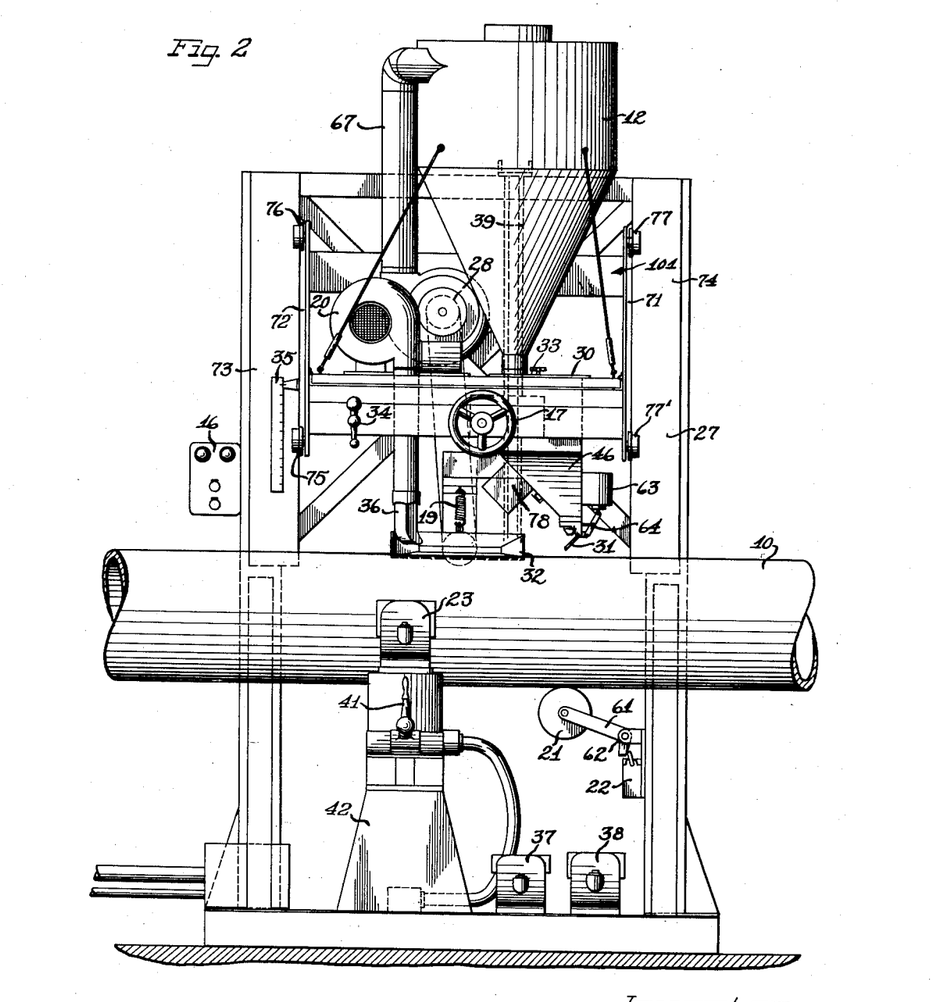
Figure 2 is an enlarged view of Figure 1.
Figure 3:
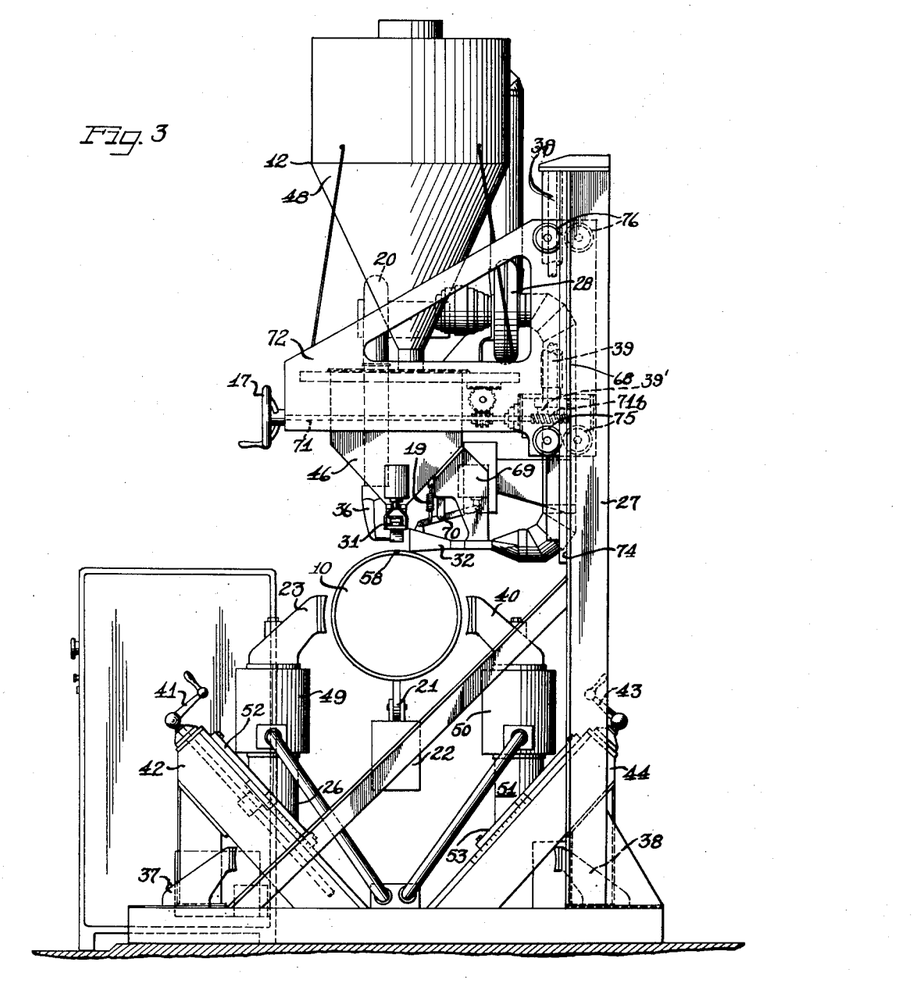
Figure 3 is a side elevational view of the magnetic inspection apparatus illustrated in Figure 1.

Referring now to Figures 1, 2 and 3, a pipe 10 to be tested is illustrated having a longitudinal weld joint. The pipe 10 is supported for longitudinal movement in any conventional manner, such as on a plurality of conveyor rollers 11. The roller 11 may be power driven, or it may be a free roller, and the pipe 10 pushed thereover by hand. The pipe 10 is moved from right to left as viewed in Figures 1 and 2.

Between the two rollers 11 shown in Figure 1 is positioned a stationary upstanding frame 27.

Secured to the lower portion of the frame 27 is a pair of magnetizing coils 49 and 50 for establishing a transverse magnetic field through which the pipe 10 passes. The longitudinal weld 58 of the pipe 10 is positioned uppermost. The coils 49 and 50 are mounted on core memebrs 26 and 51 which members also carry the poles 23 and 40. These pole pieces 23 and 40 are soft iron pieces that extend toward the pipe 10 at diametrically opposite extremities. Small gaps are provided between the pole pieces 23 and 40 and the pipe 10 to provide mechanical clearance when the pipe is in motion. This air gap may conveniently be approximately $\frac{1}{12}$ to $\frac{1}{20}$ of the pipe diameter and gets progressively larger for the larger sized pipe.

Several sets of different size spare pole pieces, such as spare pole pieces 37 and 38, are provided, and when interchanged with pole pieces 23 and 40 enable a wide range of pipe sizes to be inspected.

The magnetizing coils 49 and 50, when energized, establish a magnetic field which causes magnetic flux to flow through the pole pieces 23 and 40 and through the pipe 10 at the section under test. The flux, of course, divides, and a portion passes through the upper half of the pipe section and a portion passes through the lower half of the pipe section. The lower portions of the core members 26 and 51 are mounted on sliding members 52 and 53, which, in turn, are carried on inclined support members 42 and 44. The sliding members are arranged to be physically advanced along the supports 42 and 44 by cranks 41 and 53, respectively, (such as by a screw and nut arrangement). The center lines of the poles are adjusted to the diameter of the pipe 10 under test by turning the cranks 41 and 43. Scales on the sides of the base 42 and 44 are provided to make this adjustment.

For progressively dusting the magnetizable particles onto the surface of the weld 58 prior to its entry into the magnetic field, a hopper 46 is provided wherein is contained the magnetizable particles. The hopper 46 has an inclined bottom surface which terminates at a discharge opening.

For controlling the flow of the magnetizable particles from the hopper 46, a discharge-opening member 31 is provided, which is pivotally attached to the hopper 46. The discharge-opening member 31 is disposed in overlying relationship to the longitudinal position of the pipe 10 and provides a shut-off valve and an inclined chute which is preferably at a 40° angle for spreading the powder out into a broad band as it slides down the incline.

Controlling the opening and closing movement of the discharge-opening member 31 is a solenoid 63. The solenoid 63 is mounted on the side of the hopper 46, and when energized, actuates a rod which causes an arcuate-shaped member 64 to position in an upward direction. The arcuate-shaped member 64 is secured to the discharge-opening member 31 so as to control the movement of the discharge-opening member 31 in response to the energization of the solenoid 63. When the solenoid 63 is deenergized, the rod controlled thereby is dropped to lower the arcuate-shaped member 64 to close the discharge opening of the hopper 46.

To insure a uniform flowing of magnetizable particles through the discharge opening of the hopper 46, a magnetic vibrator 78 is provided, which is secured to the inclined bottom surface of the hopper 46. A screen is further provided inside of the hopper 46 to break up the stream of magnetizable particles falling through the hopper 46 to provide a uniform layer of powder to be applied to the pipe 10. Thus, a layer of magnetic particles of substantially uniform thickness is deposited upon the upper external surface of the pipe 10 under test.

The magnetizable particles while in the magnetic field are blown from the pipe 10 by a blower 20 thereby removing all particles except those which cluster around a crack or other defects. The blower 20 is a motor driven unit and the operation thereof will be described in detail hereinafter. Connected thereto is a tubular pipe which connects the blower 20 to a nozzle outlet 36. The nozzle outlet is positioned above the pole pieces 23 and 40 and in an overlying relationship to the welded joint 58. The nozzle outlet 36 is set at an acute angle, preferably around 45°, with respect to the axis of the pipe 10. By so positioning the outlet 36, it has been found that the sensitivity of the magnetic testing apparatus is substantially improved.

After the excess particles are blown off the pipe 10, they are recovered through a scoop nozzle 32. The scoop nozzle 32 has its axis in the horizontal plane parallel to the axis of the pipe 10. For controlling the positioning of the scoop nozzle 32, a scoop solenoid 69 is provided. The scoop solenoid 69, by means of a plunger, controls the movement of a pivotal arm 70 which is secured to the scoop nozzle 32. As a result thereof, when the scoop solenoid 69 is energized, the scoop nozzle 32 is lowered to engage the exterior portion of the pipe 10. An extension spring 19 is connected to the pivotal arm 70 to raise the scoop nozzle 32 to its normal position when the solenoid 69 is deenergized. It is to be noted that the blower 20 directs a stream of air at an angle to the axis of the pipe 10, thereby making it possible for the scoop nozzle 32 to be positioned at only one side of the pipe.

The suction required to recover the excess magnetizable particles through the inlet nozzle 32 is provided by a cyclone blower 28. The cyclone blower 28 is a motor driven unit and the operation thereof will be described in detail hereinafter. Interconnecting the intake blower 28 and the inlet nozzle 32 is a tubular pipe member 68. After the excess particles are drawn from the inlet nozzle 32 through the tubular member 68, they are blown into another tubular member 67. The tubular pipe member 67 interconnects the blower 68 and a particle collecting unit 12 so that the excess particles are finally contained in the particle collecting unit 12.

The particle collecting unit 12 has a circular funnel-shaped casing 48 forming its lower portion to provide an outlet for the collected magnetizable particles. The funnel-shaped casing portion 48 rests on a bolted cover 33 of the hopper 46, and the powder particles fall directly and continuously from the hopper 46 where they are screened and reused. The forward portion of the cover 33 is hinged to form a door 30 through which additional powder may be added to replace the powder lost in the process. The upper portion of the collecting unit 12 is a cylindrical casing wherein is fitted a tubular member 67.

A movable carriage 101 supports the hopper 46, the blower 20, the intake blower 28, the collector 12 and the members appurtenant thereto. The movable carriage 101, in turn, is carried on the upstanding frame 27 and is provided to enable the supported units to be adjusted in proper relationship to the pipe 10.

To provide vertical movement of the carriage 101 relative to the upstanding frame 27, a pair of rollers 76 are mounted on a vertical member 72 of the movable carriage 101 and engages a vertical member 73 of the upstanding frame 27. On the opposite end of the member 72 another pair of rollers 75 are provided which also engage the vertical member 73. Similarly, rollers 77 and 77' are mounted on the vertical members 71 of the carriage 101 and engage the fixed member 74 of the upstanding frame 27. To impart vertical movement to the carriage 101, a handle 17 is rotated to revolve a shaft connected thereto. The shaft 71a when rotated by the crank wheel 17, turns a worm 71b which rotates a worm wheel 39' threaded on the pedestal screw 39 fixed to the top of the frame 27. This enables the carriage 101 to be moved up and down, whereby the powder distributing and pick-up mechanism may be suitably positioned over the pipe to be tested. To enable the operator to adjust quickly the upper carriage 101 to a desired position, a scale 35 and pointer is provided.

A transverse adjustment of the carriage 101 is also provided by the turning of the handle 34. The handle 34 causes a set of gears to operate, thereby causing a shaft to turn. In so doing, another set of gears is set into operation to provide transverse movement of the carriage 101 relative to the upstanding frame 27.

Automatic operation of the solenoid 63, the magnetizing coils 49 and 50, the vibrator 78, and the scoop solenoid 69 is provided when the pipe 10 passes through the testing apparatus. As the pipe 10 passes along on the rollers 11 toward the coils 49 and 50, it first engages an actuating wheel 21. The actuating wheel 21 is secured to a lever mechanism having a tripping member 61. In response to the engagement by the pipe 10, the actuating wheel 21 is angularly moved about a pin 62. In so doing, a limit switch 22 closes its contact to operate control circuits to be described in detail hereinafter.

When the rear end of the pipe 10 disengages the actuating wheel 21, a spring (not shown) returns the actuating wheel 21 to its normal position, thereby opening the contact switch 22.

Figure 4:
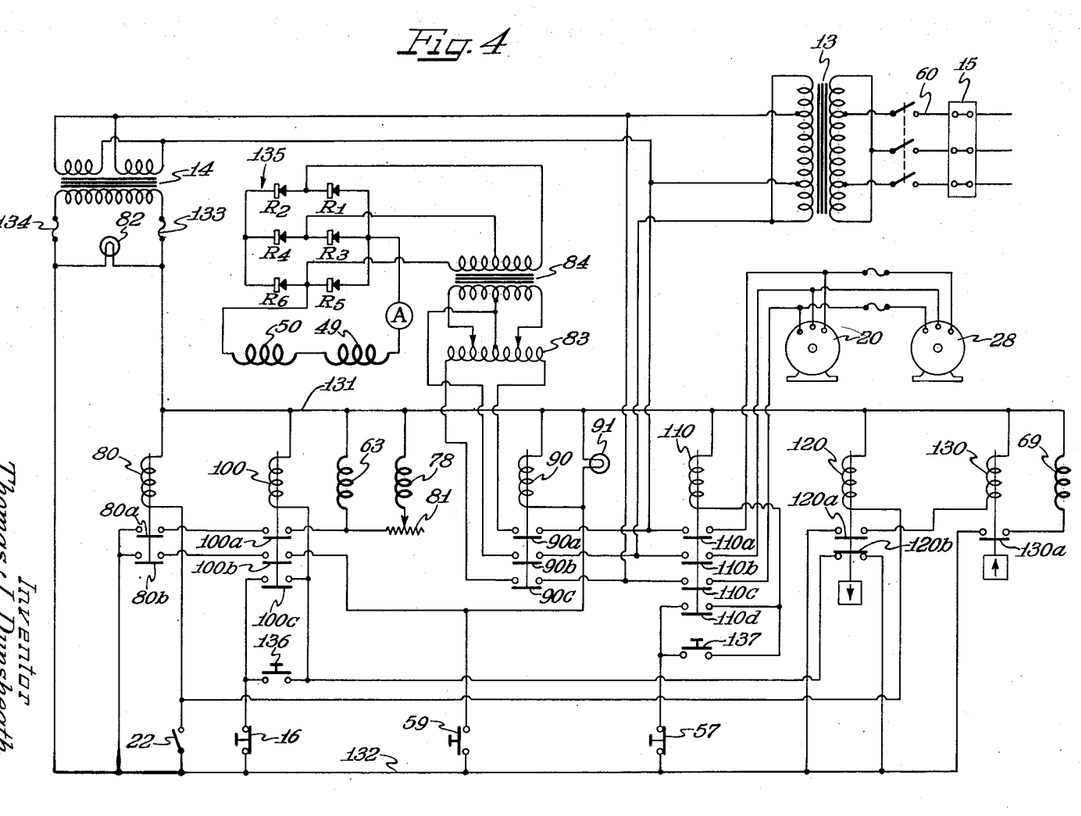
Figure 4 is a diagrammatic representation of the electrical circuits embodying this invention.

An electrical control circuit for automatically effecting the functional operation of the apparatus hereinbefore described is illustrated in Figure 4 of the drawings. The nature of the electrical power supply is, of course, governed primarily by the requirements of the magnetizing coils 49 and 50. As illustrated, a 440-volt, three-phase power supply is used and is represented diagrammatically by the terminal block 15. Since both the control circuits, as well as the energizing circuits are operated at considerably lower voltage, a step-down transformer 13 is connected to the terminal block 15 through a main line switch 60. By way of example, and not by way of limitation, the step-down transformer 13 may cut the voltage down from 440 volts to 220 volts. Off of the secondary of this step-down transformer 13, the control circuit is energized through another transformer 14 which is connected to one phase of the secondary of the transformer 13. The secondary of the transformer 14 is provided with two main buses 131 and 132 which are preferably provided with circuit breakers or fuses 133 and 134, as indicated. The control circuit, in addition to energizing the various relays for operating the switches of the circuit, also energize the applicator solenoid 63, the scoop solenoid 69, and the vibrator solenoid 78 in a manner which is hereinafter to be pointed out.

The magnetizing coils 49 and 50, as well as the motors 20 and 28, however, are energized through a power circuit from the secondary of the step-down transformer 13. As illustrated, the motors 20 and 28 are connected in parallel to the secondary of the transformer 13 through the contactor relay 110, while the magnetizing coils 49 and 50 are energized from a full-wave, three-phase rectifier 135 which, in turn, is connected through a step-down transformer 84 and a variable auto-transformer 83 and the contactor relay 90 to the secondary of the transformer 13.

The details of the control and energization system will now be described. As illustrated in Figure 4, six contactor relays 80, 90, 100, 110, 120 and 130 are provided. Relay 80 includes two normally open movable contacts 80a and 80b. Relay 90 includes three normally open movable contacts 90a, 90b and 90c. Relay 100 includes three normally open movable contacts 100a, 100b and 100c. Relay 110 includes four normally open movable contacts 110a, 110b, 110c, and 110d. Relay 120 includes one normally open movable contact 120a and one normally closed movable contact 120b. Relay 120 is time delayed in the direction indicated by the arrow. By way of example, this time delay is in the order of one second. Relay 130 has one normally open movable contact 130a and is a time delay relay in the direction indicated by the arrow. Thus, contact 130a does not close immediately upon energization of relay 130, but only after some appreciable time delay, such, for example, as one second. Upon deenergization of relay 130, contact 130a opens immediately.

Relay 80 is connected between buses 131 and 132 of the control circuit through limit switch 22. It will be recalled that the limit switch 22 is the one actuated by the depression of the roller 21 when the pipe 10 first strikes it. It will thus be apparent that the relay 80 is the relay which initiates operation of the cycle. Relay 90 is connected between buses 131 and 132 through a push-button switch 59. The relay 100 is connected between buses 131 and 132 through normally closed contact 120b of relay 120 and is also connected through a normally open push-button switch 136 and a normally closed push-button switch 16. There is still a third energization circuit for relay 100, for it is connected between buses 131 and 132 through its own movable contact 100c and normally closed push-button switch 16. This latter circuit is, of course, its own holding circuit. After the relay 100 has been once energized, it will remain energized until switch 16 is opened.

Relay 110 is connected between buses 131 and 132 through a push-button switch 137 and a normally closed push-button switch 57. The movable contact 110d of relay 110 is shunted across push-button switch 137 and, therefore, acts as a holding circuit for the relay 110.

Relay 120 is connected between buses 131 and 132 through a limit switch 22. Thus, it is energized immediately when a pipe to be inspected is passed over the roller 21. Relay 130 is connected between buses 131 and 132 through contact 120a of relay 120.

Applicator solenoid 63 and vibrator solenoid 78 are energized through contacts 100a and 80a of relays 100 and 80, respectively. It will be noted that a variable resistance 81 is in the circuit of the vibrator solenoid to control the voltage drop across this coil.

Scoop solenoid 69 is connected between buses 131 and 132 through movable contact 130a.

Relay 90 is illustrated as the one which controls energization of the magnetizing coils 49 and 50. As shown, the variable auto-transformer 83 and the transformer 84 are connected through contacts 90a, 90b and 90c to the secondary of transformer 13. Energization of the relay 90 thus supplies power to the full-wave, three-phase rectifier 135. This rectifier, as indicated, may include rectifying elements $R_1$, $R_2$, $R_3$, $R_4$, $R_5$, and $R_6$.

Relay 110 controls the energization of the motors 20 and 28. These motors are connected through movable contacts 110a, 110b and 110c directly to the secondary of the transformer 13.

A pilot light 82 is connected between the buses 131 and 132 to indicate the presence of power in this circuit. By way of example, and not by way of limitation, this pilot light may be a red light. A second pilot light 91 is connected in parallel across the relay 90 to indicate when this relay is energized, thus supplying current to the magnetizing coils 49 and 50. By way of example, and not by way of limitation, this pilot light 91 may be a green light.

The operation of the apparatus may readily be understood by an inspection of Figures 1 and 4. To place the apparatus in condition for operation, the line switch 60 is closed, and the red light 82 will glow indicating that the apparatus is in condition for operation. Conditioning relay 100 is immediately energized upon closure of line switch 60 due to the normally closed contact 120b. When the relay 100 picks up, it is maintained in an energized condition by its own holding circuit through its own contact 100c. Push-button switch 137 is now depressed to energize relay 110, and thus effect energization of the powder pick-up motor 20 and the cyclone blower motor 28.

The apparatus is now in condition to perform an inspection operation. When a pipe 10 is to be inspected, it is moved across the apparatus from right to left as viewed in Figure 1 of the drawings, and the pipe end first engages the roller 21 and depressed it to close the switch 22. This effects energization of relay 80 which, due to the fact that relay 100 has already picked up, immediately effects energization of the applicator solenoid and of the vibrator solenoid, and also effects energization of the relay 90 which causes energization of the magnetizing coils 49 and 50.

The closing of the switch 22 also effects energization of the relay 120 and causes it to immediately pick up, since the time delay associated with this relay is in its de-energizing direction rather than in its energizing direction. The closing of the contact 120a energizes relay 130, but its associated movable contact 130a does not close immediately due to the fact that the time delay of this relay is in its closing direction. This means that there is a slight delay before the scoop solenoid 69 is energized. This, of course, is desirable in order that the pipe may pass below the scoop before it is lowered onto the pipe.

It will be remembered that the roller 21 which actuates the switch 22 is located to the right of the main magnetizing coils 49 and 50, or, in other words, is located in advance of the position of the magnetizing coils when considering the direction of travel of the test piece.

When the rear end of the pipe 10 to be tested passes the roller 21, the switch 22 opens, and relays 80 and 90 immediately drop out. This has been found desirable since if the magnetizing coils are turned off the instant the switch 22 opens, the flux decreases as the cross-sectional area of the pipe decreases, and the flux density, therefore, remains approximately constant. This feature is highly desirable for if the flux density is increased due to the decrease in cross-sectional area through which the flux must pass, the powder would adhere to the rear end of the pipe even though there is no actual defect present.

At the time that relay 80 opens, the applicator solenoid and the vibrator solenoid are also immediately de-energized. Should it now be desired to stop the motors 20 and 28, it is simply necessary to depress the switch 57 causing it to open and thus break the holding circuit of the relay 110.

At the time the switch 22 opens, relay 120 also is immediately de-energized, but the contact 120a does not immediately open due to the fact that this relay has a time delay in its opening direction. Thus, relay 130 remains energized for a short period following the opening of the switch 22. This, of course, is necessary and desirable in order that the scoop may not be raised until after the end of the pipe has passed beneath it.

From the above description, it will be seen that I have provided an extremely effective and efficient apparatus for testing large, elongated objects and particularly, for testing large size tubes and pipes. Not only does the apparatus provide an efficient system for magnetizing the pipe, but also provides an efficient and economical arrangement for depositing magnetizable powder on the surface of the pipe and removing the same therefrom.

It will further be observed that I have provided for an arrangement to overcome the expected disadvantage of moving a pipe through a constant strength magnetic field where a rise of some thirty percent or so in flux density would occur at each end of the pipe over that which would exist in the central section of the pipe. This rise in flux density would, of course, occur if some means is not specifically provided, since the reduction in the cross-sectional area through which the flux must pass occurs at the ends. In order to operate the apparatus efficiently, it is desirable to adjust the flux density in the central portion of the pipe to a value near the top of the linear portion of the BH characteristic curve for the steel employed in the pipe. This is done to obtain maximum sensitivity in detecting defects. To prevent this undesired rise in flux density, the current in the magnetizing coils must be reduced during the transition period when a piece of pipe is entering or leaving the magnetic field. For best results, the current should vary in a continuous manner (as distinguished from a step-by-step manner) and should start from zero current and reach about sixty percent of its ultimate value and the end of the pipe and the center line of the magnetizing coils coincide and reach its ultimate value after a length of pipe equal to about two diameters of the pipe has passed the center line of the magnetizing coils.

I have found that the gradual increase and decrease of current in the magnetizing coils can be obtained by suitably positioning the initiating switch 22 of the control circuit. By placing the switch 22 ahead of the center line of the magnetizing coils by a distance equal to the speed of the pipe multiplied by the time constant of the magnetizing coils, advantage is taken of the large self-inductance and induced eddy currents in the yoke on which the magnetizing coils are wound. I am thus able to maintain substantially a constant flux density throughout the entire length of the pipe to be tested and avoid a masking effect at the ends of the pipe which would otherwise occur.

It will be understood that modifications and variations may be effected without departing from the scope of the novel concepts of the present invention.

I claim as my invention:

1. A magnetic inspection apparatus for ferromagnetic test pieces comprising a magnetizing unit for providing magnetic flux to a test piece, means for applying magnetizable particles to said test piece, a control unit for operating said magnetizing unit and said means, and a tripping mechanism actuated by said test piece for operating said control unit whereby said magnetizing unit and means automatically operate in response to positioning of said test piece.

2. A magnetic inspection apparatus for ferromagnetic test pieces comprising a magnetizing unit for providing magnetic flux to said test piece, means for applying magnetizable particles to said test piece, a collecting unit having an inlet scoop for collecting the excess magnetizable particles, a first circuit for lowering said scoop on said test piece, a control circuit for operating said magnetizing unit, said means, and said first circuit, and a tripping mechanism actuated by said test piece for operating said control unit, whereby said magnetizing unit, said means and said first circuit automatically operate in response to the positioning of said test piece.

3. A magnetic inspection apparatus for ferromagnetic test pieces comprising a magnetizing unit for providing magnetic flux to said test piece, a hopper unit having magnetizable particles therein for applying magnetizable particles to said test piece, a vibrating unit to provide uniform flow of magnetizable particles from said hopper, a collector unit having a scoop inlet for collecting the excess particles, a first circuit for operating said scoop inlet, a control circuit for operating said magnetizing unit, said hopper unit, said vibrating unit, and said first circuit, and a tripping mechanism actuated by said test piece for operating said control unit whereby said magnetizing unit, said hopper unit, said vibrating unit, and said first circuit automatically operate in response to positioning of said test piece.

4. A magnetic inspection apparatus for ferromagnetic test pieces comprising a magnetizing coil for providing magnetic flux for a test piece, a hopper unit having magnetizable particles therein for applying magnetizable particles to said test piece, a first solenoid circuit for controlling the application of magnetizable particles from said hopper unit, a vibrator solenoid to provide uniform flow of magnetizable particles from said hopper, a collector unit having a scoop inlet for collecting the excess magnetizable particles, a second solenoid circuit for placing said scoop inlet on said test piece, a control circuit for operating said magnetizing coil, said first solenoid circuit, said vibrator solenoid and said second solenoid circuit, and a tripping mechanism actuated by said test piece for operating said control unit whereby said magnetizing coil, said first solenoid circuit, said vibrator solenoid, and said second solenoid circuit automatically operate in response to the positioning of said test piece.

5. In a magnetic inspection apparatus for a ferromagnetic test piece comprising a hopper unit for depositing magnetizable particles on said test piece and having a refill aperture, an intake blower unit for collecting the excess magnetizable particles, means for operating said intake blower unit, a collector connected to said intake blower for collecting said excess magnetic particles, said collector being positioned over said refill aperture whereby said excess magnetic particles are deposited in said hopper for reuse.

6. In a magnetic inspection apparatus for a ferromagnetic test piece comprising a hopper unit having an outlet on the bottom thereof for depositing magnetizable particles on said test piece, a discharge opening member disposed in overlying relationship to said test piece at times covering said outlet thereby providing a shut-off valve for said hopper, and means at other times opening said discharge opening member to an inclined position for spreading said magnetizable particles into a broad sheet over said test piece.

7. A magnetic inspection apparatus for ferromagnetic test pieces of various diameters comprising a magnetizing unit having a pole thereon for providing magnetic flux for a test piece, a sliding member for mounting said magnetizing unit, guideways mounting said sliding member for inclined movement to simultaneously adjust for decreasing width and decreasing height of the test piece, and an adjusting mechanism controlling the movement of said sliding member whereby the pole of said magnetizing unit is positioned with respect to said test piece for providing improved operation.

8. In a magnetic inspection apparatus adapted for use on ferromagnetic test pieces of various diameters, a first and second magnetizing unit for providing magnetic flux to a test piece and positioned at opposite sides of said test piece, a first and second sliding member for mounting respectively said first and second magnetizing units, guideways mounting said sliding members for inclined converging movement to simultaneously adjust said unit for decreasing height and decreasing width of said test piece, and a first and second adjusting mechanism controlling the movement of said first and second sliding member, respectively, whereby said magnetizing units are positioned in diametrically opposite positions with respect to said test piece.

9. In a magnetic inspection apparatus adapted for use on ferromagnetic test pieces of various diameters, an upstanding frame, a movable carriage forming one part of said upstanding frame and having a lateral and longitudinal movement, a hopper unit for depositing magnetizable particles on a test piece and mounted on said movable carriage, a blower unit for removing the excess magnetizable particles over said test piece and mounted on said movable carriage, a collector unit for collecting the excess magnetizable particles and mounted on said movable carriage, a first adjusting mechanism for controlling the longitudinal movement of said movable carriage whereby said hopper unit, said blower unit, and said collector unit are placed in overlying relationship to said test piece to provide a more efficient apparatus, and a second adjusting mechanism for controlling the lateral movement of said movable carriage for correcting misalignment.

10. In a magnetic inspection apparatus adapted for use on ferromagnetic test pieces of various diameters, an upstanding frame, a magnetizing unit for providing magnetic flux for a test piece, a sliding member for mounting said magnetizing unit, a first adjusting mechanism secured to said upstanding frame for controlling the movement of said sliding member whereby said magnetizing unit is positioned relative to said test piece for providing improved operation, a movable carriage forming one part of said upstanding frame, a hopper unit for depositing magnetizable particles on said test piece and mounted on said movable carriage, a blower unit for removing the excess magnetizable particles over said test piece and mounted on said movable carriage, a collector unit for collecting the excess magnetizable particles and mounted on said movable carriage, and a second adjusting mechanism for controlling the movement of said movable carriage whereby said hopper unit, said blower unit and said collector unit are placed in overlying relationship to said test piece so as to provide a more efficient apparatus.

11. In a magnetic inspection apparatus adapted for use on ferromagnetic test pieces, a hopper unit for depositing magnetizable particles on a test piece, a blower unit for removing the excess magnetizable particles over said test piece, an intake blower unit for collecting the excess magnetizable particles, a scoop inlet forming the intake opening of said intake blower unit, a circuit for controlling the movement of said scoop inlet, means for energizing said circuit, and means operably controlled by said circuit for placing said scoop inlet on said test piece in response to the energization of said circuit.

12. In a magnetic inspection apparatus adapted for use on ferromagnetic test pieces, a hopper unit for depositing magnetizable particles on said test pieces, a blower unit for removing the excess magnetizable particles over said test pieces, an intake blower unit for collecting the excess magnetizable particles, a scoop inlet having a normal and operate position and forming the intake opening of said intake blower unit, a circuit for controlling the movement of said scoop inlet to the operate position, means for energizing said circuit, a spring secured to said scoop inlet for returning said scoop intake to its normal position, and means operably controlled by said circuit for placing said scoop inlet on said test pieces in response to energization of said circuit and said spring returns said scoop inlet to its normal position when said circuit is deenergized.

13. In a magnetic inspection apparatus adapted for use on ferromagnetic test pieces, a hopper unit for depositing magnetizable particles on a test piece, a blower unit for removing the excess magnetizable particles over said test piece, a nozzle on said blower unit positioned at an acute angle with respect to the axis of said test piece for improving the operation thereof, an intake blower unit for collecting the excess magnetizable particles, a scoop inlet forming the intake opening of said intake blower unit, a circuit for controlling the movement of said scoop inlet, means for energizing said circuit, and means operably controlled by said circuit for placing said scoop inlet on said test piece in response to the energization of said circuit.

14. In a magnetic inspection apparatus adapted for use on ferromagnetic test pieces, a hopper unit for depositing magnetizable particles on a test piece, a shut-off mechanism on said hopper unit for controlling the application of said magnetizable particles, a first circuit for controlling the operation of said shut-off mechanism, a blower unit for removing the excess magnetizable particles over said test piece, an intake blower unit for collecting the excess magnetizable particles, a scoop inlet forming the intake opening of said intake blower unit, a second circuit for controlling the movement of said scoop inlet, means for energizing said first and second circuits, and means operably controlled by said second circuit for placing said scoop inlet on said test piece in response to the energization of said second circuit.

15. In a magnetic inspection apparatus adapted for use on ferromagnetic test pieces, a hopper unit for depositing magnetizable particles on a test piece, a shut-off mechanism on said hopper unit for controlling the application of said magnetizable particles, a first circuit for controlling the operation of said shut-off mechanism, a blower unit for removing the excess magnetizable particles over said test piece, an intake blower unit for collecting the excess magnetizable particles, a scoop inlet forming the intake opening of said intake blower unit, a second circuit for controlling the movement of said scoop inlet, a first means for energizing said first and second circuits, means operably controlled by said second circuit for placing said scoop inlet on said test piece in response to the energization of said second circuit, and a time-delay circuit energized by said first means whereby said second circuit is energized subsequent to the energization of said first circuit.

16. In a magnetic inspection apparatus for examining relatively long ferromagnetic test pieces for flaws and other defects, a receptacle having magnetizable particles therein for distribution on a test piece, a blower unit having a nozzle positioned over the test piece at an acute angle with respect to the axis of said test piece for blowing the excess magnetizable particles from said test piece, a suction device for collecting the excess magnetizable particles, said suction device having a scoop inlet forming the intake opening of said suction device and positioned on one side only of said test piece whereby said blower nozzle blows said excess magnetizable particles into said scoop inlet.

17. In a magnetic inspection apparatus for ferromagnetic test pieces, a magnetizing unit for providing magnetic flux in a test piece, means applying magnetizable particles to said test piece, means supporting said test piece for movement relative to said magnetizing unit, a control means for operating said magnetizing unit, and a tripping mechanism positioned at a predetermined position from said magnetizing unit in accordance to the speed of movement of said test piece and actuated by an end portion of said test piece for operating said control means whereby substantially constant flux density is maintained throughout the length of said test piece to thereby prevent unwanted clustering of magnetizable particles at said actuating end portion when there is no defect therein.

18. In a magnetic inspection apparatus for ferromagnetic test pieces, a magnetizing unit for providing magnetic flux to a test piece, means applying magnetizable particles to said test piece, means moving said test piece relative to said magnetizing unit, a control circuit for operating said magnetizing unit, and a tripping mechanism positioned at a predetermined distance from said magnetizing unit in accordance to the speed of movement of said test piece and actuated by the trailing end of said test piece for operating said control unit whereby the field produced by said magnetizing unit decays in such a timed relationship with respect to the movement of said test piece as to produce a uniform flux density throughout the length of said test piece, thereby preventing clustering of magnetizable particles at said trailing end when there is no defect therein.

19. A method of providing a constant flux density at an end of a ferromagnetic piece under test in a magnetic inspection apparatus comprising energizing a magnetic unit for producing a magnetic field, moving said test piece relative to said magnetic unit and varying the current flow in said magnetic unit in proper timed relationship with the movement of said test piece to produce a constant flux density at the end of said test piece.

20. A method of providing a constant flux density at the trailing end of a ferromagnetic piece under test in a magnetic inspection apparatus, comprising energizing a magnetic unit for producing a magnetic field, moving said test piece relative to said magnetic unit, and deenergizing said magnetic unit in proper timed relationship with the movement of said test piece to produce a constant flux density at the trailing end of said test piece.

21. A method of providing a constant flux density at the end of an elongated ferromagnetic piece under test in a magnetic inspection apparatus, comprising energizing a magnetic inductor having a predetermined decay time constant for producing a magnetic field transverse to the length of said ferromagnetic piece, moving said test piece relative to said magnetic inductor, and deenergizing said magnetic inductor when the end of said ferromagnetic piece is at a distance from said magnetic inductor equal to the speed of the movement of said ferromagnetic piece multiplied by the time constant of the magnetic inductor.

22. A method of providing a constant flux density at the trailing end of an elongated ferromagnetic piece under test in a magnetic inspection apparatus, comprising energizing a magnetic inductor having a predetermined decay time constant for producing a magnetic field transverse to the length of said ferromagnetic piece, moving said test piece relative to said magnetic inductor, and deenergizing said magnetic inductor a period of the order of one time constant before the trailing end of said ferromagnetic piece has entered the inductor.

23. A method of providing a constant flux density at the end of an elongated ferromagnetic piece under test in a magnetic inspection apparatus, comprising a magnetic inductor having a predetermined decay time constant for producing a magnetic field transverse to the length of said ferromagnetic piece, moving said test piece relative to said magnetic inductor, and deenergizing said magnetic inductor a predetermined period of time prior to the end of said test piece entering said magnetic inductor such that the decay of the magnetic field compensates for the decrease in cross sectional area of the ferromagnetic piece as the end thereof passes through the magnetic field of said magnetic inductor.

24. In a magnetic inspection apparatus for a ferromagnetic test piece, a magnetic inductor for producing a magnetic field, means for moving said test piece through the field of said magnetic inductor, the field of said inductor being transverse to the path of movement of said test piece, and means for decreasing the field produced by said inductor as the end of said test piece passes through said field to maintain a generally constant flux density throughout the length of said test piece.

25. In a magnetic inspection apparatus for a ferromagnetic test piece having magnetizable particles applied thereto, a magnetic inductor having a predetermined decay time constant for producing a magnetic field transverse to the length of said test piece, means for moving said test piece relative to the magnetic field of said magnetic inductor, and means for deenergizing the magnetic inductor to provide a decaying field as the end of said test piece passes said inductor to maintain a generally constant flux density at the end of said test piece, thereby preventing clustering of magnetizable particles at the trailing end of the test piece when there is no defect therein.

References Cited in the file of this patent

UNITED STATES PATENTS

| Number | Name | Date |
|---|---|---|
| Re. 21,927 | Brace et al. | Oct. 21, 1941 |
| 1,944,954 | Sperry | Jan. 30, 1934 |
| 1,957,222 | Mershon | May 1, 1934 |
| 2,057,091 | Eurich et al. | Oct. 13, 1936 |
| 2,495,545 | Peterson et al. | Jan. 24, 1950 |
| 2,501,615 | Pugh | Mar. 21, 1950 |
| 2,563,254 | Lewis | Aug. 7, 1951 |